United States Patent [19]

Peddada et al.

[11] Patent Number: 6,031,533
[45] Date of Patent: Feb. 29, 2000

[54] GRAPHICAL USER INTERFACE FOR USE IN A DE-CENTRALIZED NETWORK ENVIRONMENT

[75] Inventors: Tarakam V. Peddada, San Jose; Abhay Kumar Gupta, Milpitas; Alex C. Wu, Fremont; Lance D. Reck, Campbell, all of Calif.

[73] Assignee: Sun Microsystems, Inc., Mountain View, Calif.

[21] Appl. No.: 08/675,680

[22] Filed: Jul. 3, 1996

[51] Int. Cl.[7] .................................. G06F 3/14; G06F 7/02
[52] U.S. Cl. ......................... 345/349; 345/329; 345/966
[58] Field of Search ..................................... 345/329, 349, 345/348, 333; 395/712, 200.31, 200.33, 200.47, 650, 349, 155

[56] References Cited

U.S. PATENT DOCUMENTS

| 5,586,304 | 12/1996 | Stupek, Jr. et al. | 395/712 |
| 5,666,501 | 9/1997 | Jones et al. | 345/348 |
| 5,731,813 | 3/1998 | O'Rourke et al. | 345/349 |
| 5,732,275 | 3/1998 | Kullick et al. | 395/712 |

OTHER PUBLICATIONS

Colyer, et al., "Depot: A Tool For Managing Software Environments", 1992 LISA VI—Oct. 19–23, 1992, pp. 153–162.

Vangala, et al., "Software Distribution and Management in a Networked Environment", 1992 LISA VI—Oct. 19–23, 1992, pp. 163–170.

*Primary Examiner*—Raymond J. Bayerl
*Assistant Examiner*—David E. Brown
*Attorney, Agent, or Firm*—Blakely Sokoloff Taylor & Zafman

[57] ABSTRACT

A method of providing a graphical user interface on a client network device is described. The client network device is coupled to a server network device and has a local storage facility, such as a hard disk unit, storing a first version of a software program. The method requires the selection of the first version of the software program as an execution version of the software program. A graphic object identifying the software program is displayed, the graphic object being user selectable to execute the execution version of the software program. A version control indicator, for example an icon, is displayed and indicates to a user of the client network device whether or not a second version of the software program, propagated to the client network device from the server network device, will automatically be selected as the execution version of the software program. The first version may be a recommended version of the software program, and the selection step may comprise selecting the recommended version of the software program as the execution version.

25 Claims, 15 Drawing Sheets

- 100 Available with floating version control.
- 102 Available with fixed version control.
- 104 Available but not the recommended version.
- 106 End of Life means that the application has been slated for discontinued support.
- 108 The application is not available on the server.

FIG. 10

GRAPHICAL USER INTERFACE FOR USE IN A DE-CENTRALIZED NETWORK ENVIRONMENT

FIELD OF THE INVENTION

The present invention pertains to the field of computer network management. More particularly, the present invention relates to a graphical user interface (GUI) for use on a client within a distributed software network environment.

BACKGROUND OF THE INVENTION

Two opposed approaches to network computing are often advocated, namely the centralized approach and the de-centralized (or distributed software) approach. The centralized approach proposes storing and maintaining all application software at a central server, to which an end-user has access from a client terminal. The centralized approach has the advantages of allowing easy software management and maintenance. This approach also enjoys the benefits of a long history which have allowed the approach to be fine tuned and well-developed.

De-centralized environments (also termed distributed software environments) are a more recent development in network computing. The de-centralized approach advocates distributing a copy of an application program to each client network device that requires the application program, so that the application software is shared by fewer users, or even a single user. This approach has the primary advantage of ensuring that a single failure within the network does not cripple the entire network, as occurs when a central server in a centralized network environment fails. An advantage provided by the de-centralized approach is stand-alone functionality, when required. On the other hand, a number of the advantages provided by centralized environment are lost. In particular, the installation, maintenance and management of software applications is complicated. These tasks are further complicated when the network is a heterogeneous network, comprising on different computer platforms.

To adequately sustain a de-centralized network, a software distribution and management system should provide at least the following functions:

1. application distribution;
2. application installation;
3. application customization;
4. application upgrading; and
5. the removal of obsolete applications.

These functions may be performed in a number of ways. For networks including very few computers, it may be feasible for a network manager to perform the above functions manually. However, as the distances between computers within the network increase, and the number of computers and applications installed on the network increases, it becomes extremely burdensome, and often impossible, for the above functions to be performed manually. Accordingly, it has become necessary to develop remote software distribution and management systems, which allow a network manager to remotely distribute, install and maintain software applications over a network which may comprise hundreds of servers and thousands of clients located over a number of continents.

One such software distribution and management system is described in the publication by Ram R. Vangala and Michael J. Cripps, "Software Distribution and Management in a Networked Environment," 1992 LISA VI, Oct. 19–23, 1992, pp. 163–170. While the system disclosed in this document provides a number of basic functions to meet the requirements of a de-centralized network, a number of issues and requirements are not addressed. A further discussion of de-centralized network management is provided in the publication by Wallace Colyer and Walter Wong, "Depot; A Tool for Managing Software Environments," 1992 LISA VI, Oct. 19–23, 1992, pp. 153–162. This publication proposes integrating separately maintained software programs, in a de-centralized network environment, into a common hierarchy comprising a union of these packages. While the publication provides one solution to a specific problem inherent in a de-centralized environment, there are again numerous requirements within a de-centralized network environment that are not addressed.

More specifically, the status and version of a software application available and installed on a client network device in de-centralized network environment may be changed and upgraded remotely by a network manager, without the knowledge of the end-user. Accordingly, an end-user may be unaware of what application programs are currently available to him or her, and also whether an application program the end-user has been utilizing is still available. Furthermore, when a network manager remotely updates a version of a software application utilized by an end-user, the end user may be unaware of this update.

SUMMARY OF THE INVENTION

According to first aspect of the invention there is provided a method of providing a graphical user interface on a client network device. The client network device is coupled to a server network device and has a local storage facility, such as a hard disk unit, storing a first version of a software program. The method requires the selection of the first version of the software program as an execution version of the software program. A graphic object identifying the software program is displayed, the graphic object being user selectable to execute the execution version of the software program. A version control indicator, for example an icon, is displayed and indicates to a user of the client network device whether or not a second version of the software program, propagated to the client network device from the server network device, will automatically be selected as the execution version of the software program. The first version may be a recommended version of the software program, and the selection step may comprise selecting the recommended version of the software program as the execution version. The recommended version may optionally be the most recent version of the software program.

A recommendation indicator, indicating whether the software program is recommended for use, may also be displayed.

An availability indicator indicating whether the software program is available for execution may also be displayed. Further, in one embodiment, the version control indicator or the recommendation indicator are only provided if the software program is available for execution.

An end-of-life indicator, indicating that the software program is due to become unavailable, may also be displayed.

In one embodiment, the method includes the steps of storing a plurality of execution commands for initiating execution of the software program. One of the plurality of execution commands is selected as a default execution command and associated with the graphic object representing the software program.

According to a second aspect of the invention there is provided a graphical user interface for use on a client network device. The client network device has a storage facility storing a first version of a software program and is coupled to a server network device. The software program is executable from the graphical user interface. The graphical user interface includes a graphic object identifying the software program, the graphic object being user selectable to execute the first version of the software program The graphical user interface further includes a version control indicator indicating to a user whether or not the graphic object will be user selectable to execute a subsequent version of the software program distributed to the client network device from the server network device.

According to a third aspect of the invention there is provided a method of providing a graphical user interface on a client network device. The client network device has a storage facility storing a software program and is coupled to a server network device. The method includes the step of displaying a graphic object identifying the software program, the graphic object being user selectable to execute the software program. A status indicator to indicate the status of the software program (to a user of the client network device) is also displayed. The status of the software program stored on the storage facility of the client network device is remotely changed from the server network device. The status indicator is then updated to indicate the changed status of the software program.

Remotely changing the status may comprise changing the status of the software program from being available to being unavailable, or vice versa.

Remotely changing the status may comprise changing the status of the software program from being recommended to not recommended, or vice versa.

Remotely changing the status may comprise changing the status of the software program to terminal.

BRIEF DESCRIPTION OF THE DRAWINGS

The present invention is illustrated by way of example and not limitation in the figures of the accompanying drawings, in which like references indicate similar elements and in which:

FIG. 10 shows examples of icons utilized by the graphical user interface of the present invention.

DETAILED DESCRIPTION

A graphical user interface for use in a de-centralized network environment is described. In the following description, for purposes of explanation, numerous specific details are set forth in order to provide a thorough understanding of the present invention. It will be evident, however, to one skilled in the art that the present invention may be practiced without these specific details.

De-centralized Network Overview

Figure 1:
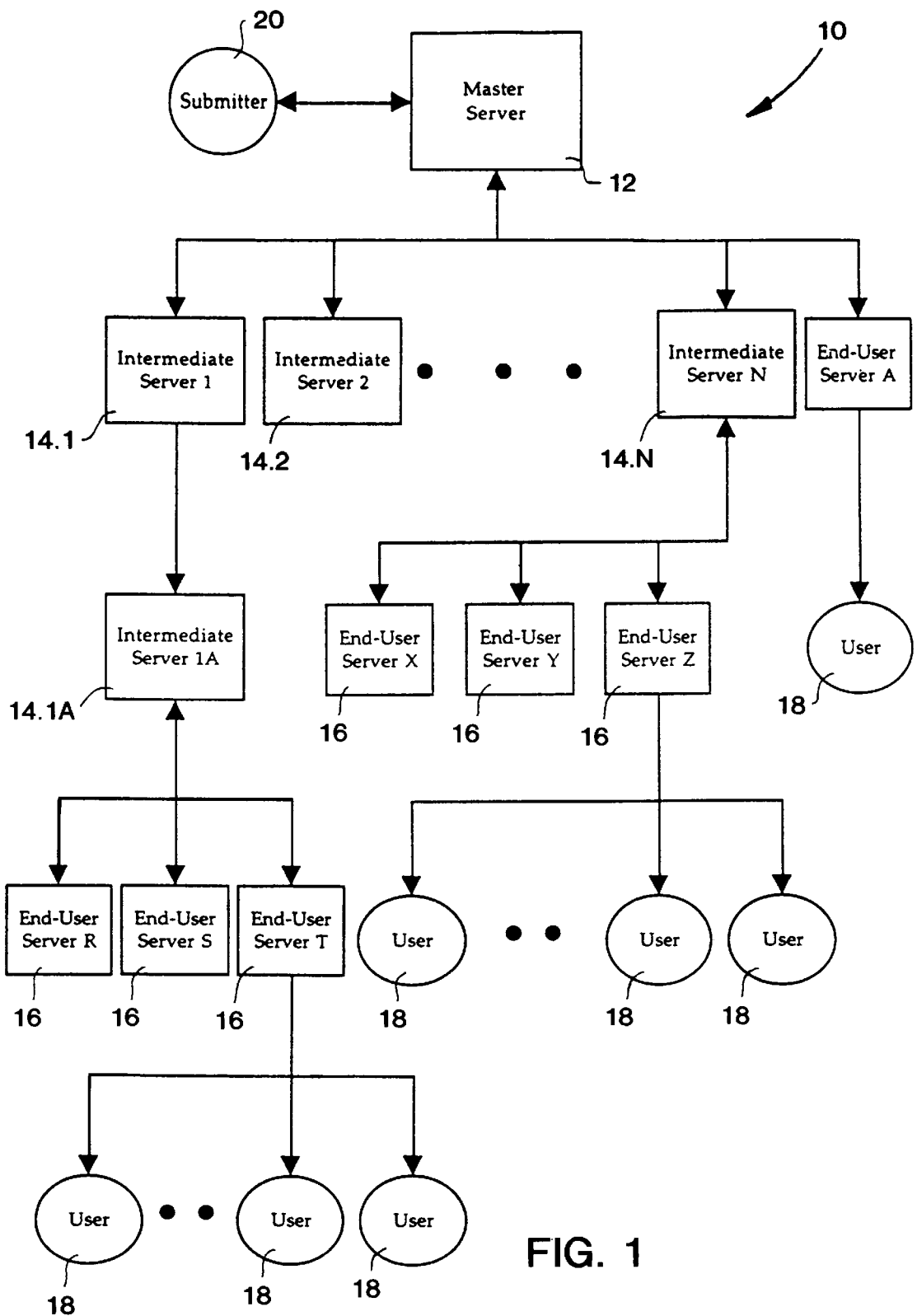
FIG. 1 is a schematic representation of a de-centralized network on which the present invention can function and be employed.

FIG. 1 shows a partially de-centralized computer network 10 within which the present invention functions and is installed. The network 10 employs a client/server architecture, and accordingly includes a number of servers and clients. For the purposes of this specification, the term "server" refers to a device from which software is distributed, and the term "client" refers to a device to which the software is distributed. Accordingly, a device to which software is distributed for the purpose of distributing the software to other devices functions both as a client and a server.

The servers comprising the network 10 are hierarchically classified as being either a master server 12, an intermediate server 14 or an end-user server 16. The illustrated network 10 includes a single master server 12 and N intermediate servers 14 coupled to the master server 12. A second-level intermediate server 14.1A is coupled to intermediate server 14.1. A number of end-user servers 16 are typically coupled to an intermediate server 14.1A, and a number of clients 18 are coupled to each end-user server 16. It will be appreciated that each server is classified according to its interconnected relationship with other servers and clients, and that an end-user server 16 may be coupled directly to a master server 12, as shown in FIG. 1.

The clients 18 may be workstations (such as SPARC workstations available from Sun Microsystems, Inc. of Mountain View, Calif.), personal computers (PCs), Macintosh computers (Mac) or so-called "dumb" terminals. Each client 18 is able to mount an end-user server 16, and either upload application software from the end-server 16 for execution on the relevant client 18, or initiate execution of application software on the end-user server 16 itself. The network 10 is regarded as a partially de-centralized network (or distributed software network) as software utilized by a client 18 resides on a local end-user server 16 which is mounted by the client 18.

Each end-user server 16 stores software which is utilized by only the small number of clients 18 coupled to the relevant end-user server 16. The partially de-centralized network 10 shown in FIG. 1 provides a very specific example of a de-centralized network model. It will readily be appreciated that an end-user server 16 may also function as a client on which a user operates. The degree of de-centralization present in a network may also vary considerably. In a "pure" de-centralized network model, each client 18 is provided with a storage facility, such as a hard disk, on which all software required by the client 18 is stored. As the degree of de-centralization increases, the autonomy of each client 18 is increased, and the effect of a failure within the network can be localized to a greater extent. However, a greater degree of de-centralization is accompanied by an increase in software installation, maintenance and management overhead. Accordingly, for a network which includes a large number of clients 18, the degree of de-centralization is restrained by the maintenance overhead that accompanies the de-centralization.

Software Distribution and Management System

Figure 2:
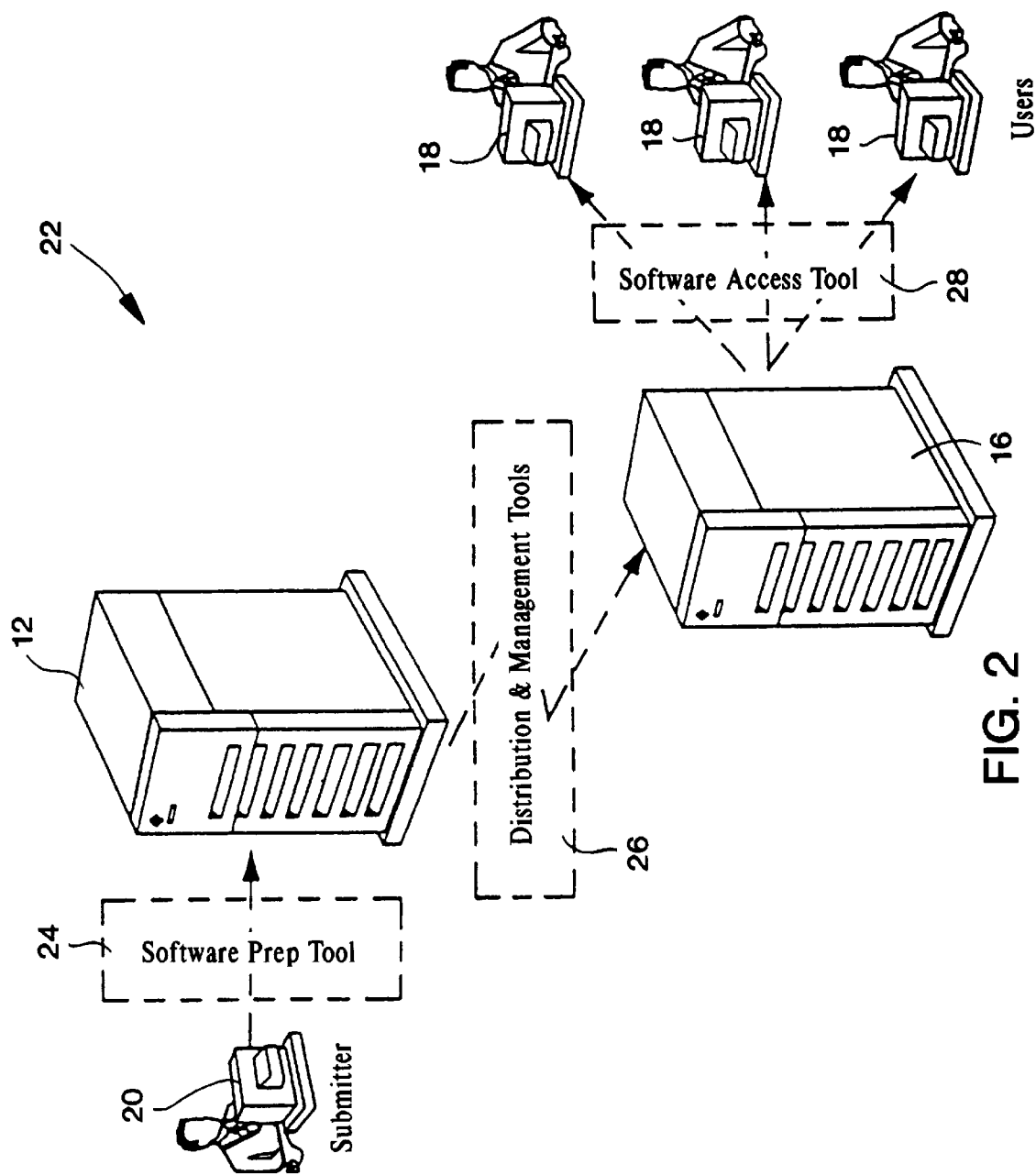
FIG. 2 is a schematic representation of a network portion on which a software access tool incorporating the present invention can be implemented.

Referring to FIG. 2, a de-centralized network portion 22 is shown. The network portion 22 comprises a master server 12, an end-user server 16, a submitter terminal 20 coupled to the master server 12, and a set of clients 18 coupled to the end-user server 16. In one embodiment, a number of intermediate servers (not shown) are connected between the master server 12 and the end-user server 16. In another embodiment, the master server 12 and the end-user server 16 are coupled directly. A software distribution and management system is resident on the network portion 22, and facilities the preparation, distribution, installation and user-access of software in the network portion 22. More specifically, the software distribution and management system comprises a software preparation tool 24, distribution and management tools 26, and a software access tool 28. The software preparation tool 24 enables a user of the submitter terminal 20 to prepare and package software, stored on the master server 12, for distribution over a network to the end-user server 16. The distribution and management tools 26 facilitate the distribution of software from the master server 12 to the end-user server 16, and also the management and maintenance of the software once it has been installed. The software access tool 28 enables a user of a client 18 to access software installed on the end-user server 16.

The Graphical User Interface: Overview

The graphical user interface proposed by the present invention forms part of the software access tool 28, and provides a convenient and user-friendly interface by which a user is able to initiate the execution of a software application program stored on a client network device. The terms "client network device" and "server network device" shall be used throughout the specification. A client network device is coupled, either directly or via a number of other network devices, to a server network device, and the server network device has the capability to distribute, install and modify software application programs and files stored on the client network device. The client network device may furthermore comprise a single unit having both the facilities to store and execute a software program. Alternatively, a client network device may comprise the combination of a server, such as an end-user server 16 shown in FIG. 1, and a terminal, which mounts the end-user server 16. The software application program may be stored on the server 16, and execution thereof (either on the server itself or on the terminal) is then initiated from the terminal.

Figure 11:
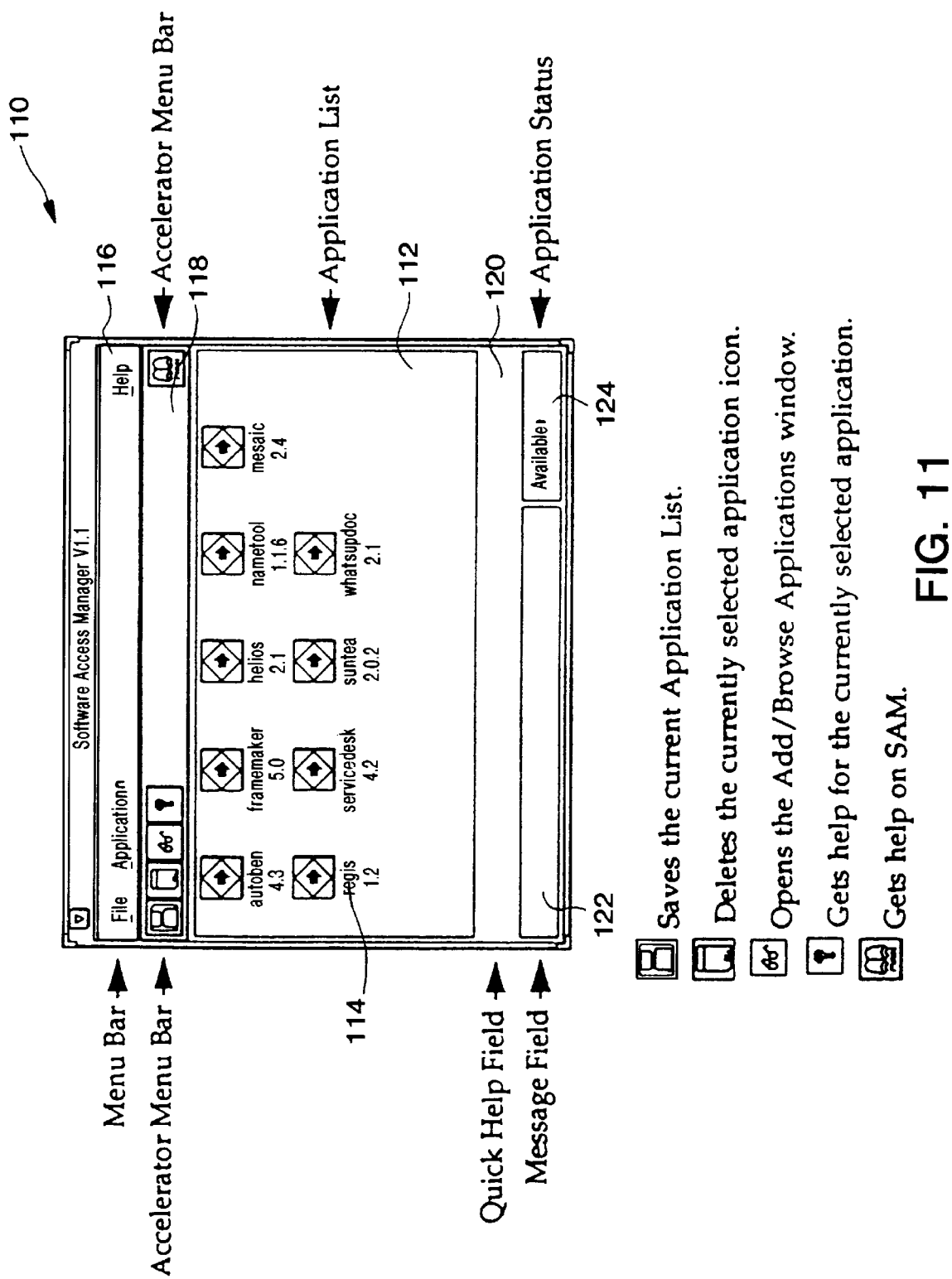
FIG. 11 shows a main window presented by the graphical user interface according to the invention.

The GUI 30 displays a main window, illustrated in FIG. 11, which presents a number of graphic objects, or icons, which a user is able to select to execute a software program associated with the selected graphic object. The main window is displayed on a video display unit (VDU), such as a cathode ray tube (CRT) display or a liquid crystal display (LCD) attached to a client network device. The user selects a graphic object utilizing a pointer device, such as a mouse, or cursor arrows on a keyboard attached to the client network device.

Figure 3:
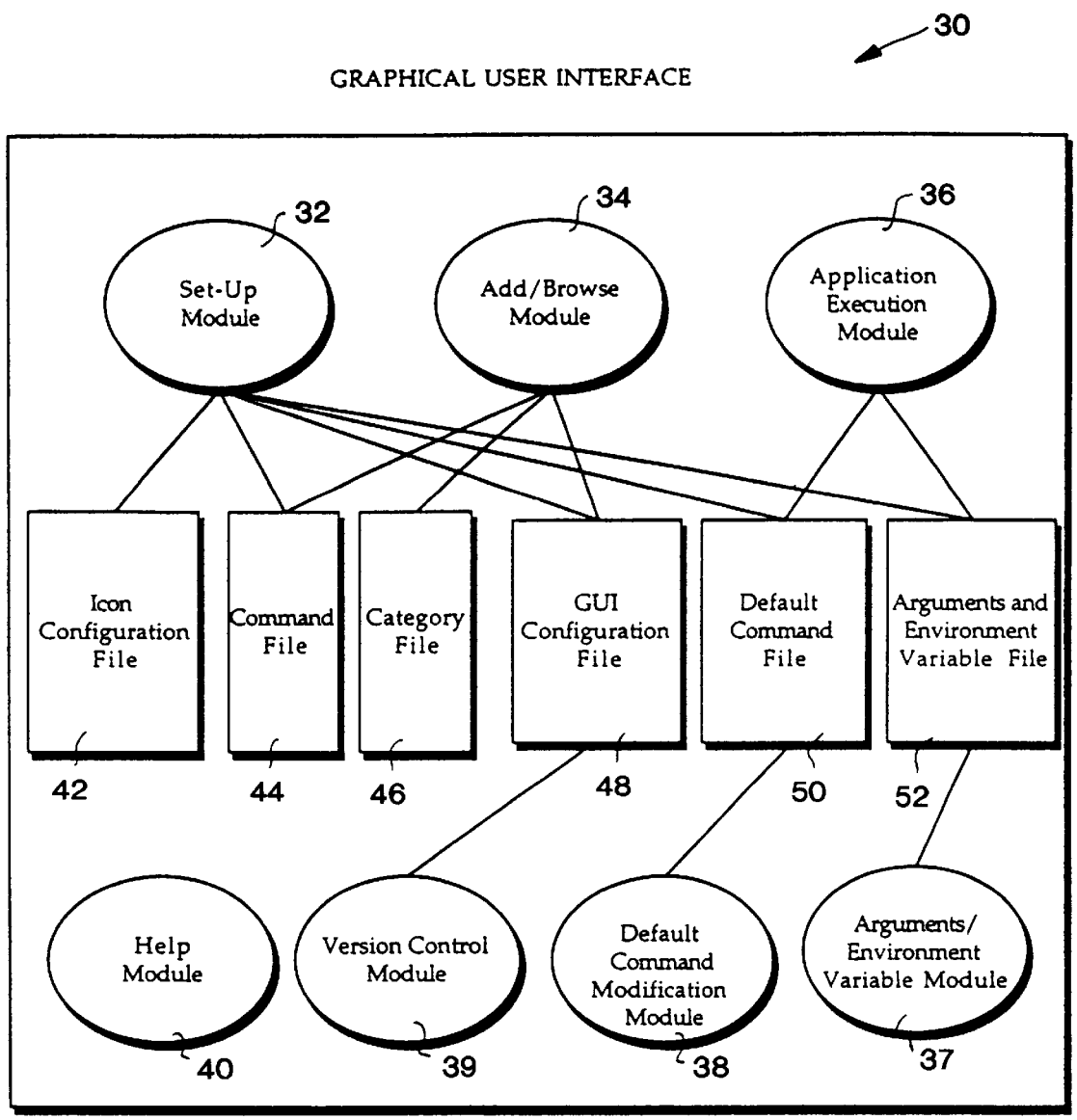
FIG. 3 is a diagrammatic representation to a graphical user interface according to the present invention.

Referring to FIG. 3, there is shown a diagrammatic representation of a graphical user interface (GUI) 30 according to the invention. The GUI 30 comprises a number of software modules, which access, read and modify the contents of a number of data files. More specifically, the GUI 30 comprises the following software modules, further details of which are provided in the description which follows:

1. a set-up (or initialization) module 32: this module is responsible for setting up a main window (described below) presented by the GUI 30.
2. an add/browse module 34: this module allows a user to add graphic objects representing software application programs to the main window, and also to execute software application programs which are not presented in the main window presented by the GUI 30.
3. an application execution module 36: this module attends to the actual transmission of an application program execution command from the GUI 30.
4. an arguments/environment variable module 37: this module prompts a user for arguments and variables when required for execution of an application program, and stores these arguments and variables.
5. a default command modification module 38: this module allows a user to modify the default command that is issued by the application execution module 36 to initiate execution of a software application program.
6. version control modification module 39: this module allows a user to determine whether or not a default version of a software application program to be executed is automatically updated, or whether a version of a software application program to be executed is fixed.
7. a help module 40: this module provides the user with "help" text which assists the user to operate the graphical user interface 30.

The GUI 30 also comprises the following data files:
1. an icon configuration file 42;
2. a command file 44;
3. a category file 46;
4. a graphical user interface (GUI) configuration file 48;
5. a default command file 50; and
6. an arguments and environment variable file 52.

Details regarding the files 42–52 are provided below.

Data Files

Figure 4:
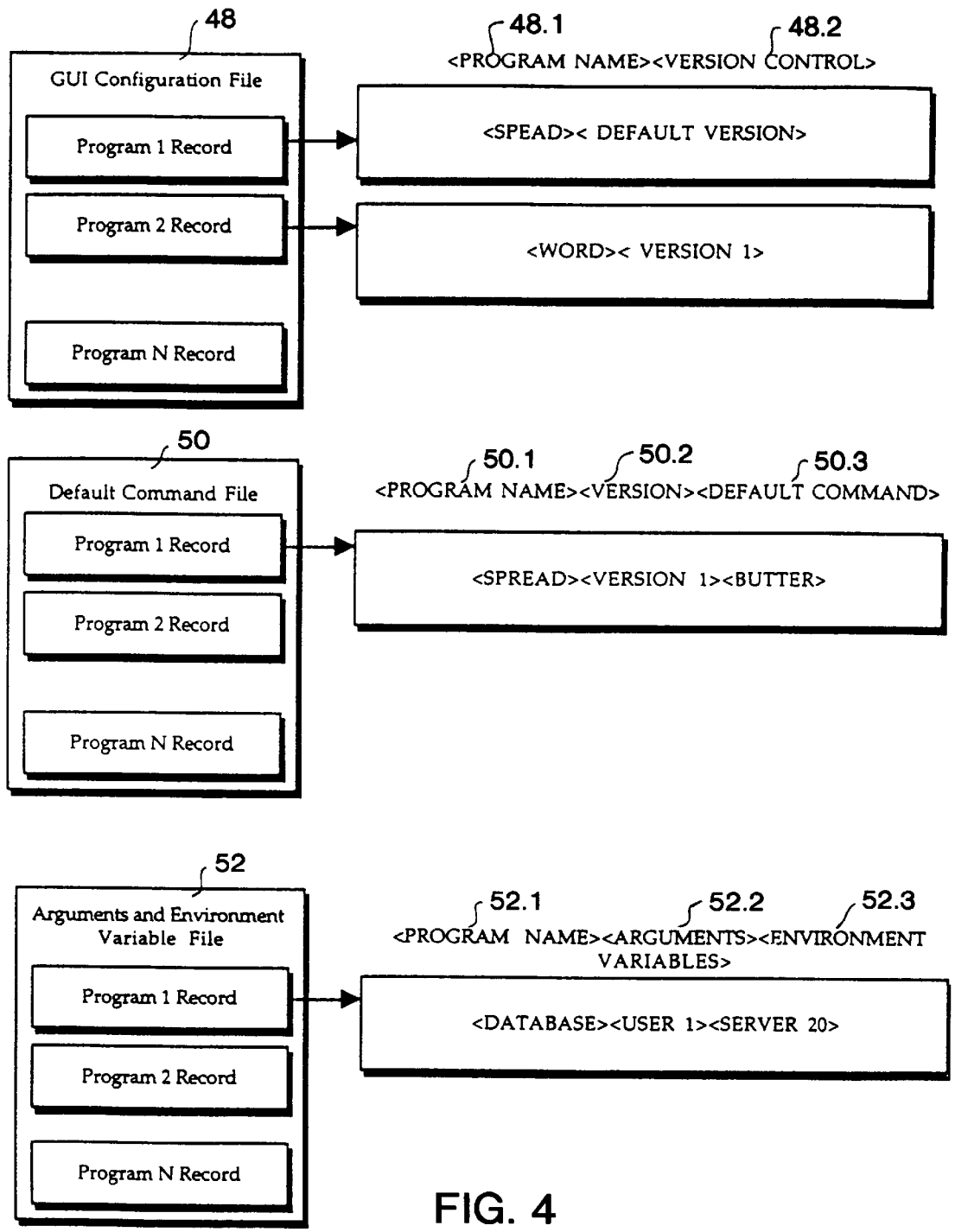
FIGS. 4 and 5 are diagrammatic representations of the structure and contents of data files incorporated within the present invention.
Figure 5:
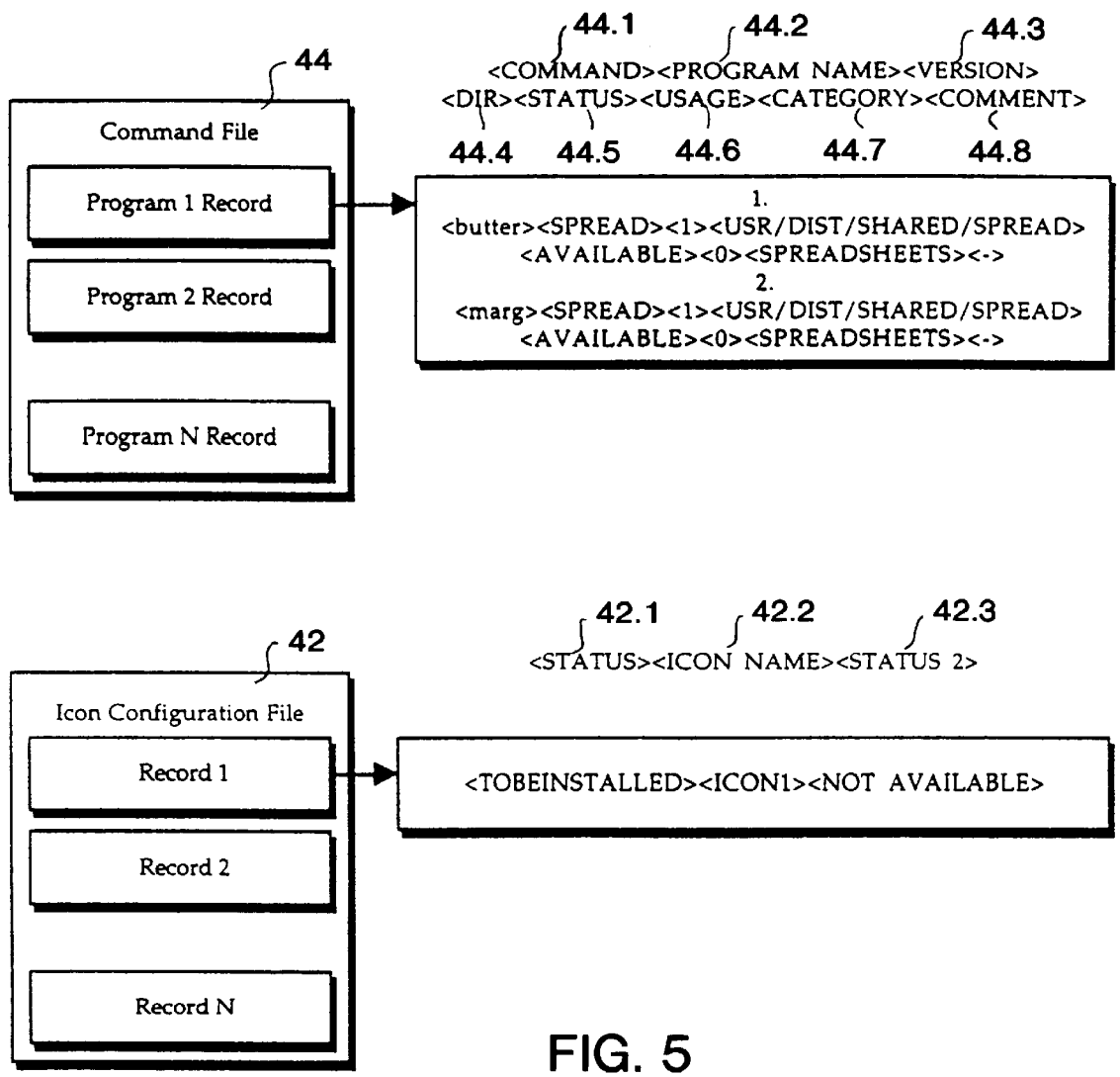
Figure 7:
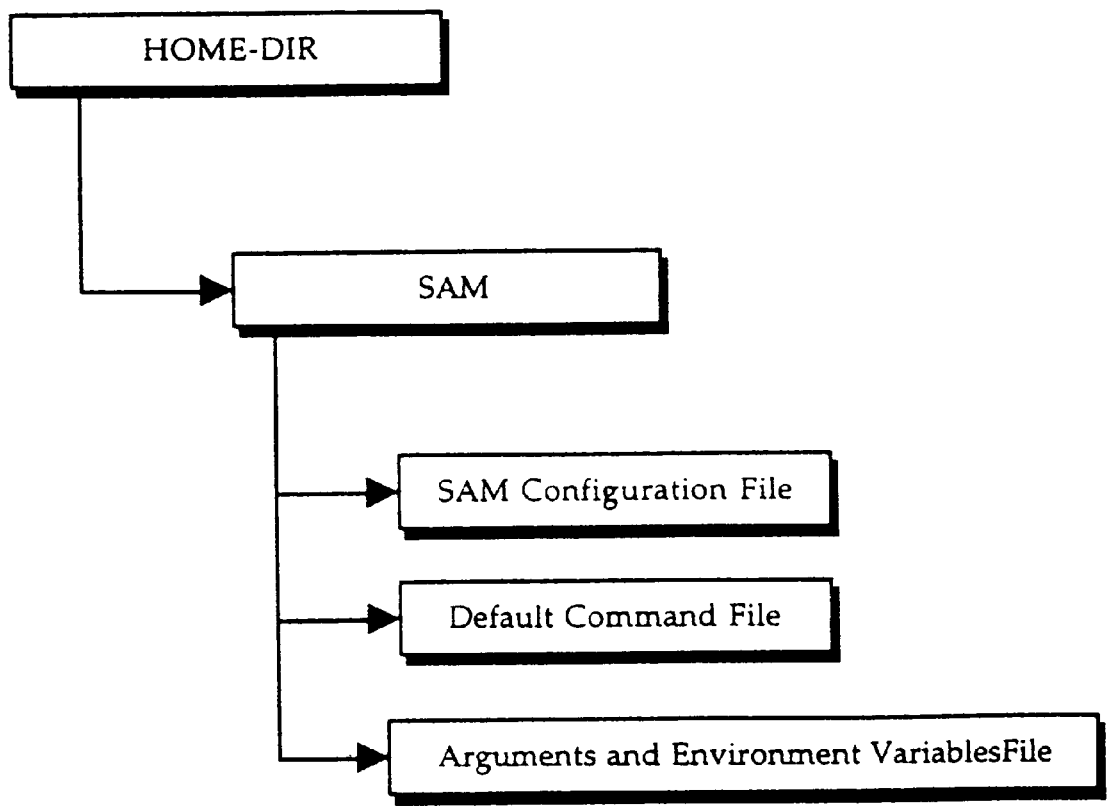
FIGS. 7 and 8 are directory trees showing the relative locations of the data files shown in FIGS. 4 and 5.
Figure 8:
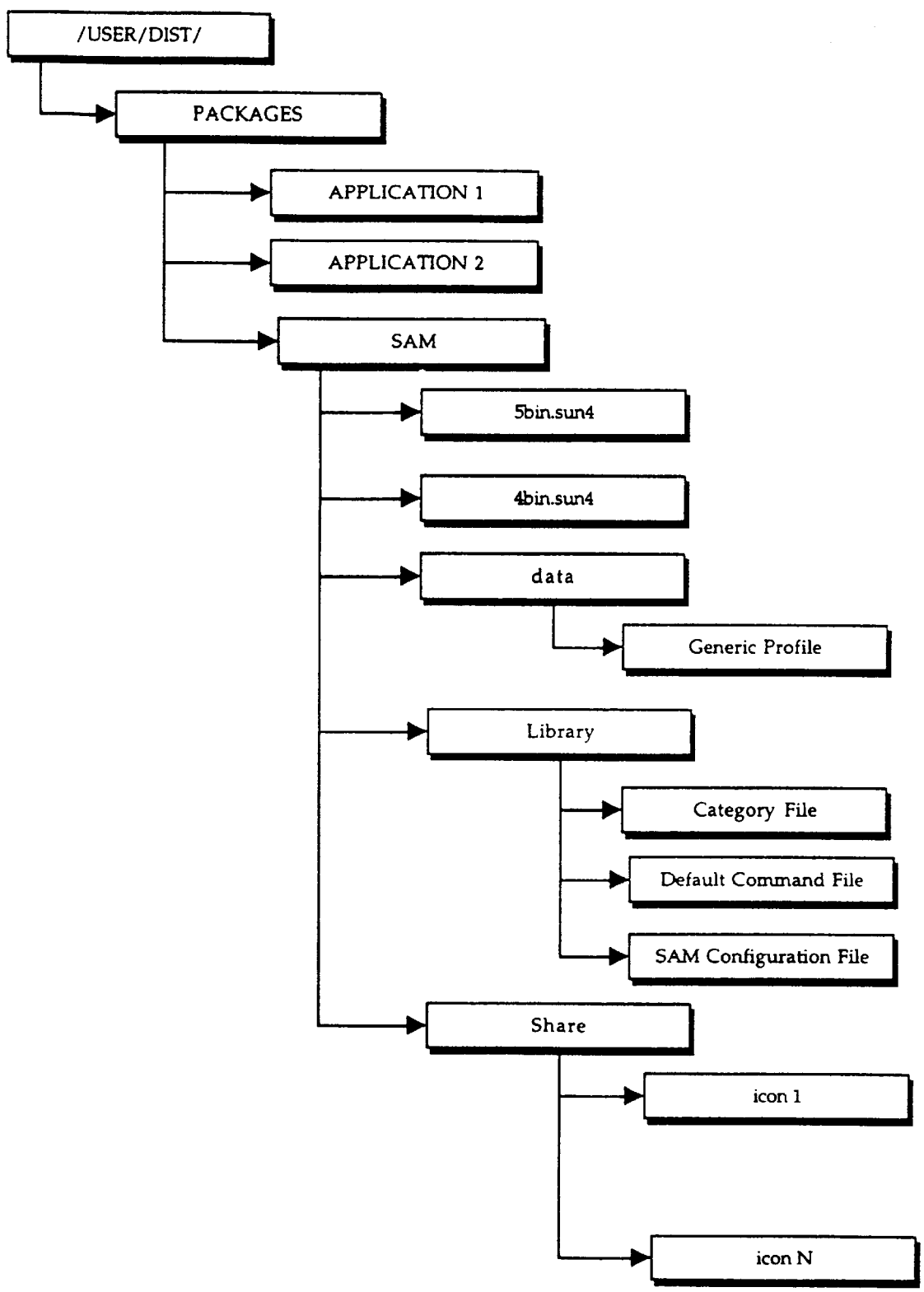

Detailed representations of the data files 42–52 are provided in FIGS. 4 and 5. The files shown in FIGS. 4 and 5 may all reside on a single client network device. In an alternative embodiment on a partially decentralized network, such as that shown in FIG. 1, the files shown in FIG. 4 may reside on a client 18, whereas the files shown in FIG. 5 may reside on an end-user server 16. In one specific embodiment, the various files may be located relative to each other as indicated in the directory trees shown in FIGS. 7 and 8. Referring again to FIG. 1, the directory tree shown in FIG. 7 may be implemented on a client device 18, whereas the directory tree shown in FIG. 8 may be implemented on an end-user server 16.

Referring now specifically to FIG. 4, the GUI configuration file 48 contains a record for each software program for which a graphic object is displayed on the main window by the GUI 30. Each software program record contains at least two fields, namely a PROGRAM NAME field 48.1 and a VERSION CONTROL field 48.2. The PROGRAM NAME 48.1 for each record contains a name identifying the particular application program. The VERSION CONTROL field 48.2 contains a version control determinator, which is used by the set-up module 32 to provide an indication of whether a subsequent version of the software program installed on a network device will automatically be selected as a default version for execution when the relevant graphic object is selected on the main window. In the example software programs records provided in FIG. 4, the program SPREAD is provided with the version control determinator DEFAULT VERSION, indicating that selection of the appropriate graphic object on the main window will execute the latest (or most recent) version of the program SPREAD. Alternatively, the software program record for the program WORD contains the version control determinator VERSION 1. Accordingly, selection of a graphical object, presented on the main window, and associated with software program 2, will always execute version 1 of the program WORD, irrespective of whether a subsequent version of this program has been installed on the network device.

It will further be appreciated that only graphic objects associated with the records contained in file 48 will be displayed for selection by the GUI 30. Accordingly, by adding to or deleting records from this file, user-selectable graphic objects that are presented by the GUI 30 on the main window can be added or deleted.

The default command file 50 similarly contains a record for each software program for which a user-selectable graphic object is presented on the main window by the GUI 30. Each software program record within file 50 includes at least a PROGRAM NAME field 50.1, a VERSION field 50.2 and a DEFAULT COMMAND field 50.3. The VERSION field 50.2 specifies that either a specified version or any version of the software program as being executable by the command contained in the DEFAULT COMMAND field 50.3. The DEFAULT COMMAND field 50.3 contains a command that is retrieved by the application execution module 36 for issuance from the GUI 30. It may occur that a software program has a number of commands by which execution thereof can be initiated. In this case, the contents of the DEFAULT COMMAND field 50.3 may be changed when a user invokes the default command modification module 38. The default command modification module 38 presents a user with all commands by which a specific software program can be executed. The user is then able to select any of the commands as the default command, the selected command then being stored in the DEFAULT COMMAND field 50.3. Accordingly, the purpose of the default command file 50 is to maintain a record of a selected command by which a user wishes to invoke a software program, and to indicate whether the selected command invokes only the version specified in VERSION field 50.2, or any version of the software program.

The arguments and environment variable file 52 also contains a software program record associated with each software program for which a graphic object is displayed by the GUI 30, and for which additional arguments and/or environment variables may be required for proper execution. Each record within file 52 contains a PROGRAM NAME field 52.1, an ARGUMENTS field 52.2 and an ENVIRONMENT VARIABLES 52.3. In the example illustrated in FIG. 4, the software program named DATABASE, in addition to a command, requires the shown argument and environmental variable to commence execution. More specifically, the DATABASE program requires that a user input a user number and also select a server on which a database to be accessed by the program DATABASE resides. This information is then stored in file 52 as indicated.

Turning now to FIG. 5, the command file 44 again contains a record, or set of records, for each software program that is stored on a network device, irrespective of whether a user-selectable graphical object associated with the software program is displayed by the GUI 30. Each record contains a number of fields including a COMMAND field 44.1, a PROGRAM NAME field 44.2, an VERSION field 44.3, a ROOT DIRECTORY field 44.4, a STATUS field 44.5, a USAGE field 44.6, a CATEGORY field 44.7 and a COMMENT field 44.8.

The COMMAND field 44.1 contains a command by which execution of the relevant software program can be initiated. For example, the first record indicates that the program SPREAD is initiated by the command BUTTER. It is not uncommon for a software program to be executable by two commands, in which case two entries for the particular software program will be incorporated within the appropriate record. As shown in FIG. 5, the program SPREAD may also be initiated by the command MARG. Referring back to FIG. 4, the command BUTTER is indicated to be the default command by which a user has chosen to initiate execution of the program.

The PROGRAM NAME field 44.2 indicates the program name, and the VERSION field 44.3 indicates the version of the program associated with the command. The ROOT DIRECTORY field 44.4 indicates the location of the relevant software program, while the STATUS field 44.5 indicates the current status of the relevant program. The software program could have any status listed in the "full" status block 60, shown in FIG. 6. The USAGE field 44.6 contains a variable, the value of which can be toggled to switch a usage monitoring function on and off. The usage monitoring function monitors the level of usage of the relevant package.

The CATEGORY field 44.7 indicates the category by which the software program may commonly be identified. In the given example, the program SPREAD is identified as being a spreadsheet. A selection of other example categories according to which the software program can be classified are contained in category file 46 and listed below in Table 1:

TABLE 1

1. NOT AVAILABLE
2. BEING DOWNLOADED
3. TO BE INSTALLED
4. END OF LIFE
5. AVAILABLE

The icon configuration file 42 maps the "full" status of a software program to a pre-determined icon, and to a "reduced" set of status conditions. The icon configuration file 42 contains a record for each status listed in full status list block 60. Each record in the file 42 includes a STATUS field 42.1, and an ICON NAME field 42.2 listing the name of an icon file. Each record also contains a STATUS 2 field 42.3, which indicates a status shown in a "reduced" status block 62, shown in FIG. 6. Accordingly, a status indicated in the full status block 60 is mapped to a corresponding status in the reduced status block 62. Each status in the reduced status block 62 is furthermore mapped by the setup module 32 to a "displayed" status in the displayed status block 64, as will be described in further detail below.

Set-Up Module—Methodology

Figure 9:
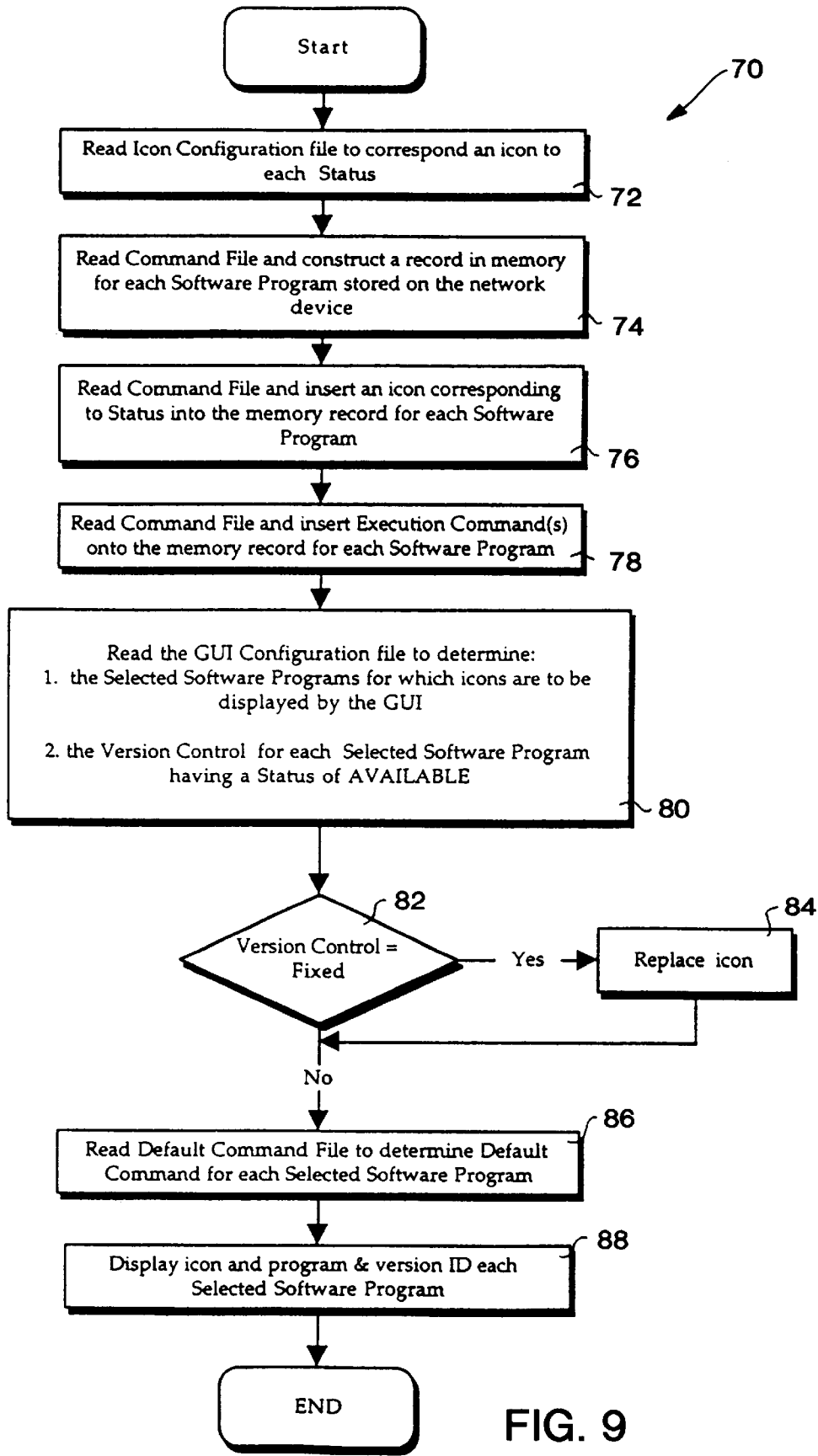
FIG. 9 is a flow chart illustrating a method performed by a setup module to provide a main window of the graphical user interface according to the invention.

Referring to FIG. 9, there is shown a flow chart illustrating a method 70 performed by the set-up module 32 to provide a main window, which is the primary interface of the GUI 30.

Figure 6:
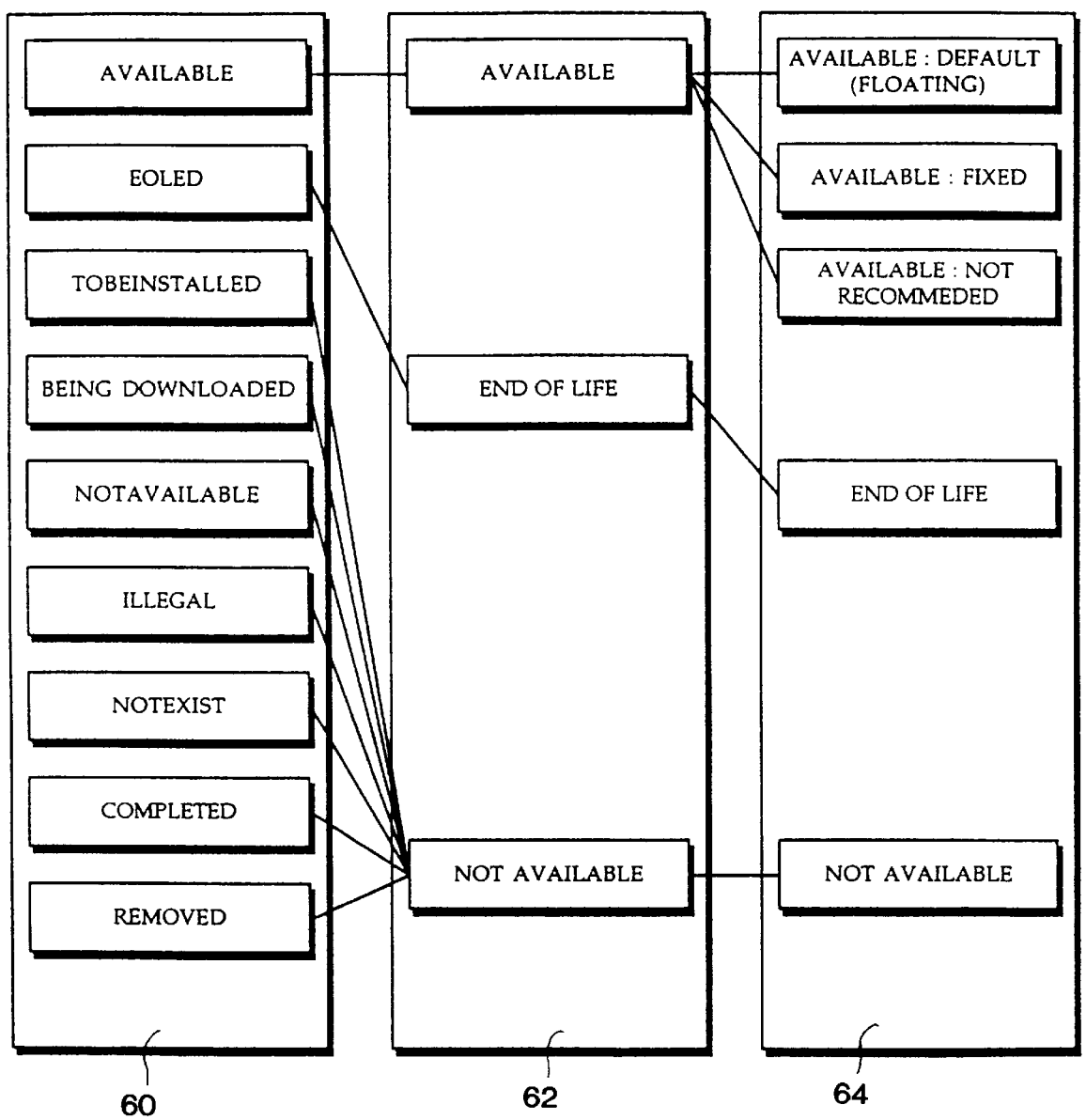
FIG. 6 is a chart showing the mapping of a full set of status conditions to a displayed set of status conditions.

At step 72, the set-up module 32 accesses the icon configuration file 42, to correspond to a graphic object in the form of a status icon to each of the status conditions listed in full status block 60 in FIG. 6. More specifically, each status in the full status block 60 is corresponded to an icon representing a status shown in the "reduced" status block 62. Referring to FIG. 10 and reduced status block 62, the icon 100 corresponds to the AVAILABLE status, the icon 106 corresponds to the END OF LIFE status (indicating the status of the software program as being terminal), and the icon 108 corresponds to the NOT AVAILABLE status. Referring again to FIG. 9, the method 70 then proceeds to step 74, at which the set-up module 32 reads the command file 44 and constructs a record in memory for each software program stored on the network device. At step 76, the set-up module 32 again reads the command file 44, and inserts an icon corresponding to the status of the software program into the memory records created at step 74. At step 78, the set-up module 32 again reads the command file 44, and inserts a list of execution commands into the memory record for each software program.

At step 80 the set-up module 32 accesses the GUI command file 48, to identify the software programs for which icons must be displayed on the main display window presented by the GUI 30. As described above, an icon (or graphic object) will be displayed for each software program for which a record exists in the GUI configuration file 48. Having selected software programs for which icons are to be displayed, the set-up module 32 then examines the VERSION CONTROL field 48.2 for each software program.

At decision block 82, a determination is made as to whether the VERSION CONTROL field 48.2 for each software program indicates the version as being a "fixed" or a "floating" (default) version. As explained above, an indication that a "floating" version of the software program is to be executed causes a recommended version of the software program (for example the lastest version) to be executed upon user selection of a graphic object associated with the software program. If it is determined at decision block 82 that the version control is fixed, the method proceeds to step 84 at which the icon within the appropriate memory record (as inserted at step 76) is replaced by an icon indicating a "fixed" version control. Referring back to FIG. 6, this process represents the mapping of the AVAILABLE STATUS in the "reduced" status block 62 to the AVAILABLE: FIXED status in the "displayed" status block 64.

Referring again to FIG. 9, the method 70 then proceeds to step 86 where the set-up module 32 reads the default command file 50, to determine which of the commands, in the memory record for a software program, is to be the default command issued from the GUI 30 to initiate execution of the relevant software program. At step 88, the method then displays a program identifier for each software program listed in the GUI configuration file, and also an icon representing the status of each software program. For the software programs which are available for execution, the icon also identifies the version control applied with respect to that software program.

FIG. 10 provides an example of a set of icons that provide an indication of the status of a software program. Furthermore, for those software programs which are available for execution, the icons provide an indication of the version control. More specifically, the icon 100 indicates that an available software program has "floating" version control, whereas the icon 102 indicates that an available software program has a "fixed" version control. Similarly, the icon 104 indicates that an available version of a software program is not a recommended version thereof.

FIG. 11 shows an example of a main window 110, which is set up by the set-up module 32 and displayed by the GUI 30. The main window 110 includes an application list panel 112, in which a program identifier and an icon for each software program is displayed. More specifically, the program/version identifier for each program comprises text 114, each text 114 being associated with an icon shown in FIG. 10. In the shown example, each of the software programs is indicated by an appropriate icon as being available, with "floating" version control. It will be appreciated that the each of the pairs of program/version identifiers and icons shown in FIGS. 10 and 11 provide merely one example of a graphic object identifying a software program and a version control indicator. The graphic object identifying the software could be text or any other icon. Furthermore, the indication of the version control need not be provided as an icon, but could alternatively be provided in some other way, such as by coloring, flashing, or positioning a graphic object in a particular way.

In a first example (not shown), the main window 110 may contain the "available but not recommended" icon 104 associated with a version 1 of PROGRAM X, and the "available with floating version control" icon 100 associated with version 2 of PROGRAM X, thus indicating version 2 is the recommended execution version of PROGRAM X. Should version 3 of PROGRAM X then be distributed and installed on the relevant network device as a recommended version, version 3 will now usurp version 2 as the recommended, execution version of the program. According, the "available with floating version control" icon 100 will the become associated with version 3, and the "available but not recommended version" icon 104 will become associated with version 2. The icon 104 may remain associated with version 1, assuming that there is no change in the status of this version.

In a second example (not shown), the main window may again contain the "available but not recommended" icon 104 associated with a version 1 of PROGRAM X, and the "available with fixed version control" icon 102 associated with version 2 of PROGRAM X. Should version 3 of PROGRAM X then be distributed and installed on the relevant network device as a recommended version, version 3 will again be installed as the recommended, execution version of the program. According, the "available with floating control" icon 100 will the become associated with version 3. However, the icon 104 will now become associated with version 2, indicating that version 2 is now available but not recommended. The icon 104 may remain associated with version 1, assuming that there is no change in the status of this version.

A user is able to execute a software program utilizing the default execution command by selecting an appropriate graphic object in a first manner, for example by "double clicking" on the graphic object using a pointing device, such as a mouse. However, the user is presented with the option of executing the relevant software program using any further execution commands (i.e. execution commands other than the default execution command) included in the command file 44. By selecting an appropriate graphic object in a second manner, for example by "single clicking" on the graphic object using the pointing device, a window (not shown), or pop-up menu, is invoked in which are displayed all execution commands by which the software program may be executed. The user is then able to select an execution command of choice from this window.

The main window 110 further incorporates a number of other panels, namely a menu bar panel 116, and an accelerator menu bar panel 118, a help field panel 120, a message field panel 122 and an application status panel 124.

Figure 12:
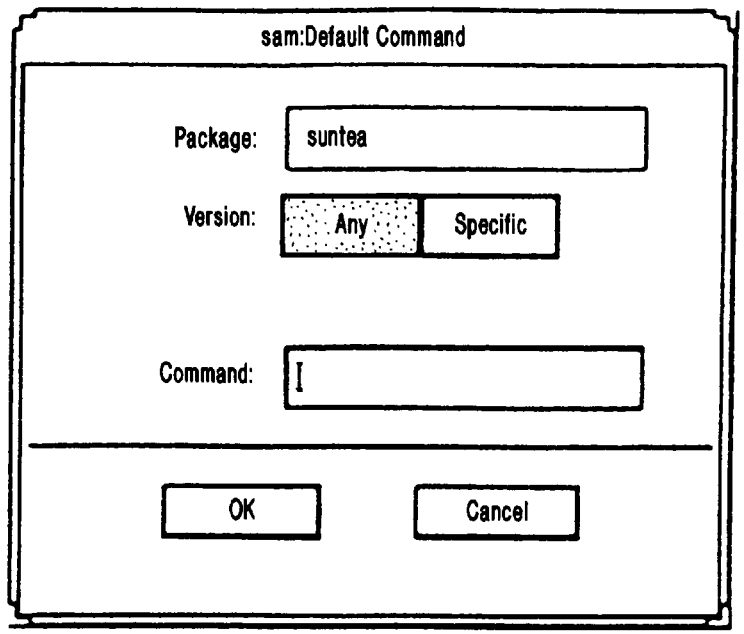
FIG. 12 shows a default command window invokable from the main window shown in FIG. 11.

In the menu bar panel 116, a user can activate FILE and APPLICATION pull-down menus. More specifically, the FILE menu allows the user to save a list of programs displayed in the application list panel 112, to restore a previous display of program icons, and to exit the GUI 30. The APPLICATION menu provides a user with the following options:

1. add/browse: this option allows a user to add graphic objects representing software programs to those displayed in the application list panel 112, and to browse software programs available on the network device, but not displayed in the application as window 112, for execution.
2. remove: this allows a user to remove a graphic object from the application list panel 112.
3. restore basic set: this allows a user to restore a pre-determined set of graphic objects for display in the application list window 112.
4. refresh: this option allows a user to refresh the main window 110, and cause the set-up module 32 to update the displayed status and version control of each software program.
5. set default command: this option allows a user to change a selected default command. More specifically, the selection of this option invokes the default command modification module 38, which in turn presents a user with a default command window 130, shown in FIG. 12. The default command window 130 allows a user to modify the default command that will be issued from the GUI 30 to execute the relevant software program, the modified default command then being stored in the DEFAULT COMMAND field 50.2 of an appropriate record in the default command file 50, as described above.
6. change version control: this option allows a user to change how the version of a software program will be updated. By setting the version control as "floating", the GUI 30 will always execute the latest version of the software program upon selection of the appropriate graphic object. Alternatively, a user may set the version control to be "fixed" in which case the fixed version of the software program will be executed, regardless of the availability of subsequent versions.
7. application status: the selection of this option causes the status of a selected program to be checked, and displayed in the application claims panel 124.

The menu bar panel 116 further includes a HELP pull-down window which invokes the help module 40, to provide a user with assistance regarding windows presented by the GUI 30, the various displayed icons, or a selected software program. Various other help features well known in the art may be incorporated in the HELP pull-down menu.

The accelerator menu bar panel 118 incorporates a number of icons for providing direct access to a number of the functions provided in the pull down menus discussed above. The quick help panel 120 displays concise help on various functions provided by the pull down menus and accelerator buttons of the accelerator menu bar 118. The message field 122 displays program execution status messages, and the application status field 122 displays a status from the "reduced" status block 62.

The Add/Browse Module: Methodology

Figure 13:
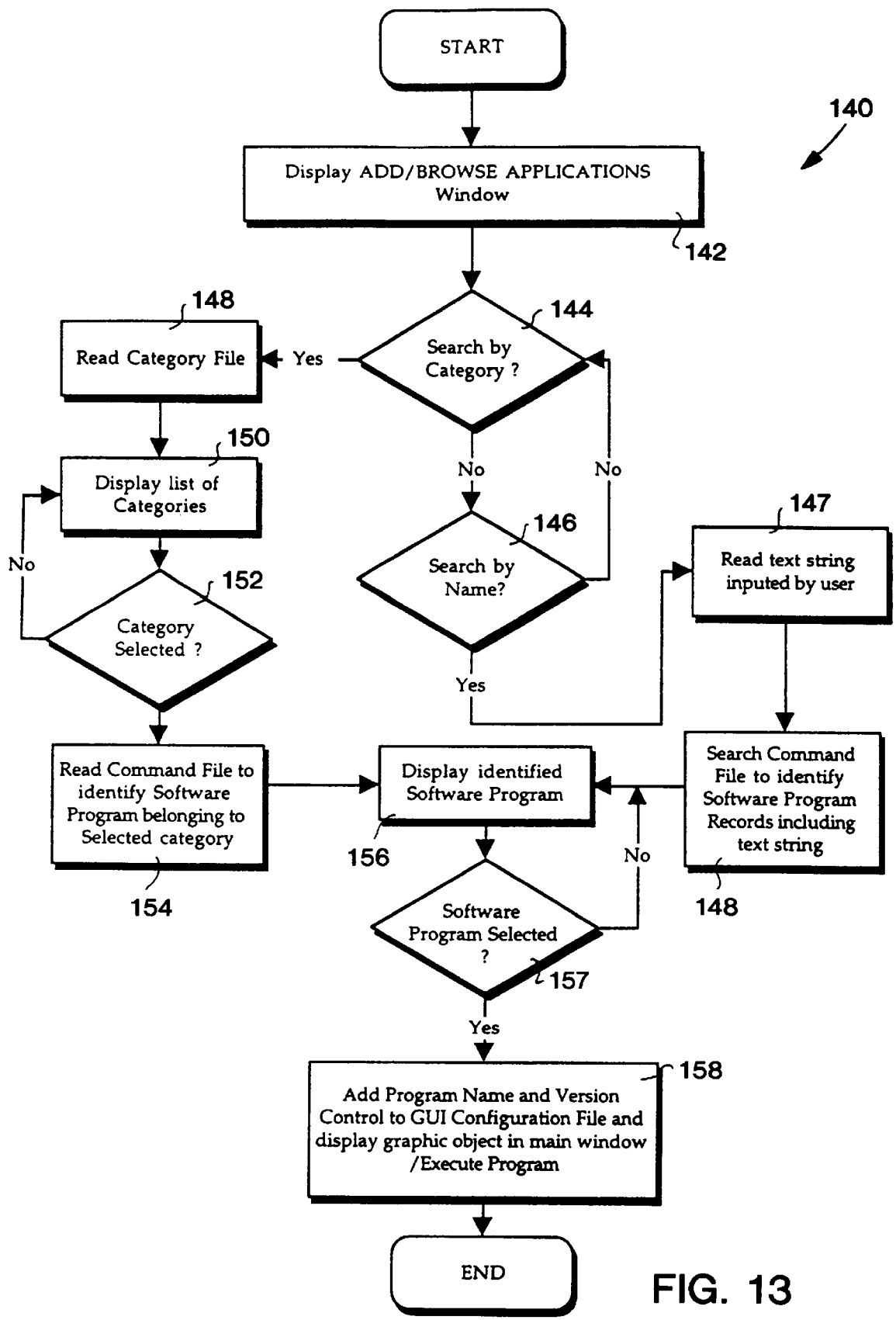
FIG. 13 is a flow chart illustrating a method by which a user may add a graphic object associated with a software program to the main window shown in FIG. 11.
Figure 14:
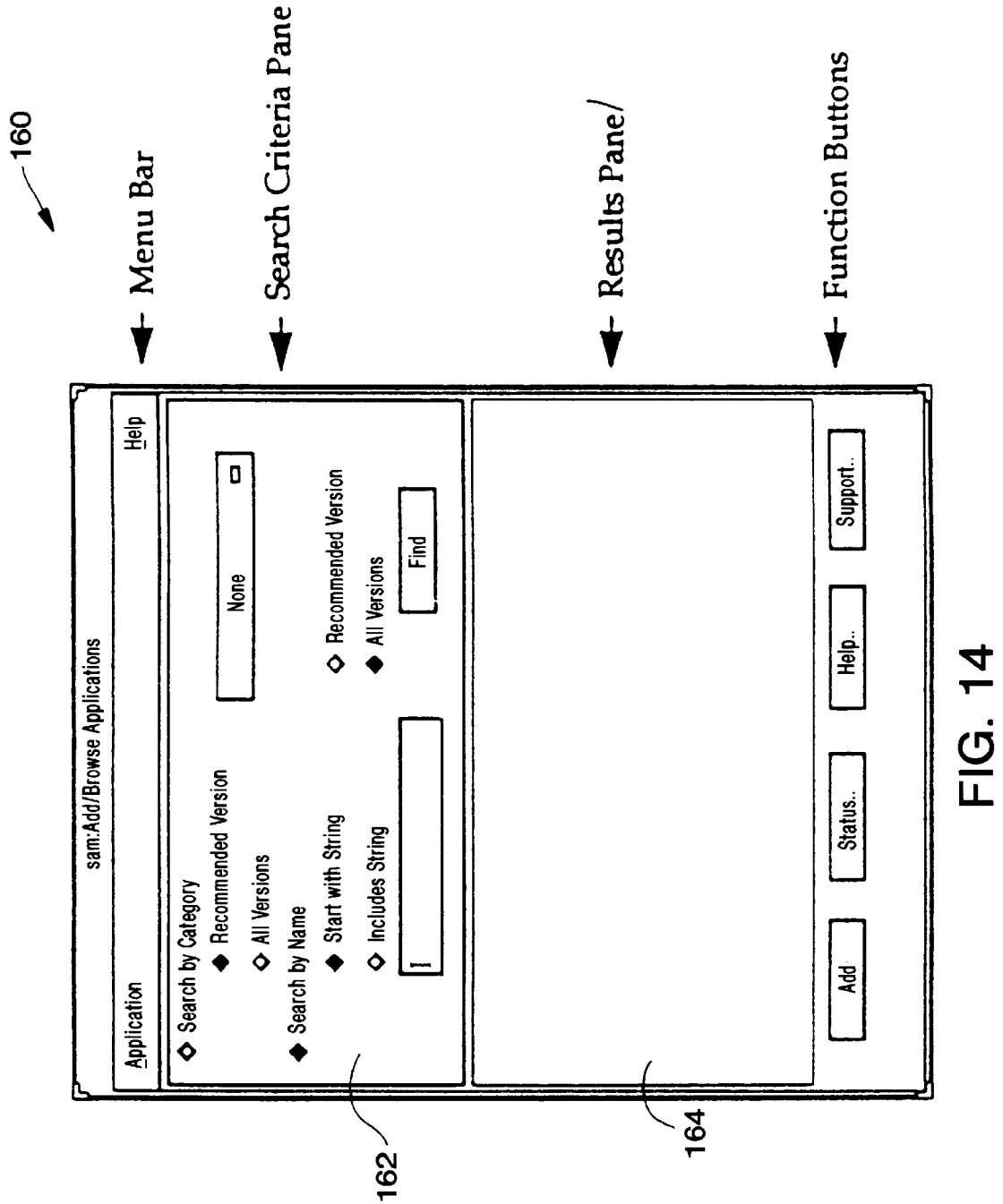
FIG. 14 shows an add/browse window utilized by the method illustrated in FIG. 13.

Referring to FIGS. 13 and 14, a method 140 is shown by which a user may add a graphic object corresponding to a software program to the GUI configuration file 48 for display in the application list panel 112 of the main window 110. The method 140 is performed by the add/browse module 34. Alternatively, once a software program has been selected, the user may elect merely to execute the program without inserting a corresponding graphic object into the main window 110. The method begins at step 142 with the display of an ADD/BROWSE APPLICATION window 160, as shown in FIG. 14. By making the appropriate selections in the search criteria panel 162 of window 160, the user indicates whether the search is to be conducted by category or by name. Referring to FIG. 13, a determination is then made at decision blocks 144 and 146 whether the search is to be conducted by category or by name. If it is determined at decision block 144 that the search is to be conducted by category, the add/browse module 34 reads the category file 46 at step 148, and then displays the list of predetermined categories at step 150. In one embodiment, these categories are the categories indicated above in Table 1. Once it is determined at decision block 152 that a user has selected a category, the add/browse module 34 reads the command file 44, and more specifically, the CATEGORY fields 44.7 of the records therein, to identify programs belonging to the selected category at step 154. At step 156, the add/browse module 34 displays the identified software programs in a results panel 164 of window 160. Once a determination has been made at decision block 157 that a particular package has been selected, then the program name and a version control determinator are added to the GUI configuration file 48, so that a graphic object corresponding to the software program will be displayed in the application list panel 112 of the main window 110. More specifically, to add a graphic object to the main window, a user may simply drag-and-drop the relevant graphic object from the results panel 164 of window 160 to the application list panel of main window 110.

Alternatively, should a user wish merely to execute the selected software program, execution is performed at step 158.

Alternatively, should it be determined at step 146 that the search is to be conducted by name, a user is required to input a text string, which is then read by the add/browse module 34 at step 147. At step 148, the command file 44 is then searched to identify any software program records including a text string which matches the text string inputted by the user at step 147. The method then proceeds through steps 156 to 158 as described above.

Application Execution Module (Command Generator)—Methodology

The application execution module 36 is responsible for detecting the selection, by a user, of a graphic object/identifier displayed in the application list panel 112 of the main window 110. On detection of such a selection, the application execution module 36 issues a command, read from the default command file 50 to thereby initiate execution of the software program. In one embodiment, for graphic objects representing a "floating" version control, the command issued is "linked" to a default version of the software program, thus ensuring that the most recommended version of the program is executed by the issuance of the relevant command.

Figure 15:
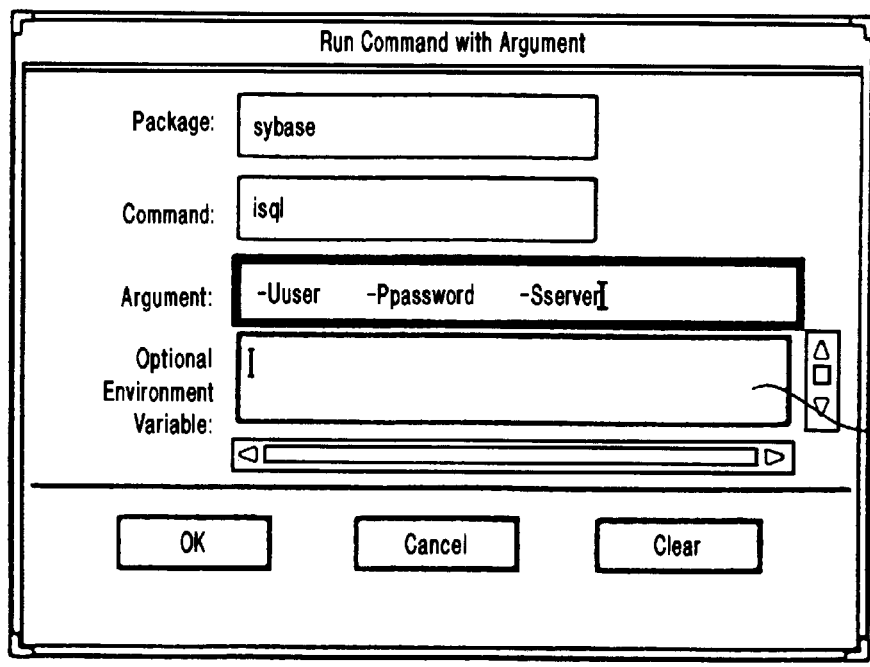
FIG. 15 shows an arguments/environment variable window presented by the graphical user interface of the present invention.

For some software programs, additional arguments and environment variables may be required to successfully initiate execution. In this case, the application execution module 36 detects the need for such arguments and/or environment variables, and invokes the arguments and environment variable modules 37 which in turn presents the window 170, shown in FIG. 15, to a user. The user then can then enter the appropriate arguments and environment variables within the field 172. Arguments and environment variables so entered are then stored by the module 37 in the arguments and environment variable file 52, illustrated in FIG. 4. Accordingly, when a user again attempts to execute the relevant software program, the window 170 will again be presented and the arguments and variables previously entered will be displayed in the panel 172. The user can then confirm these arguments and variables or modify them before executing the program.

Network Device

Figure 16:
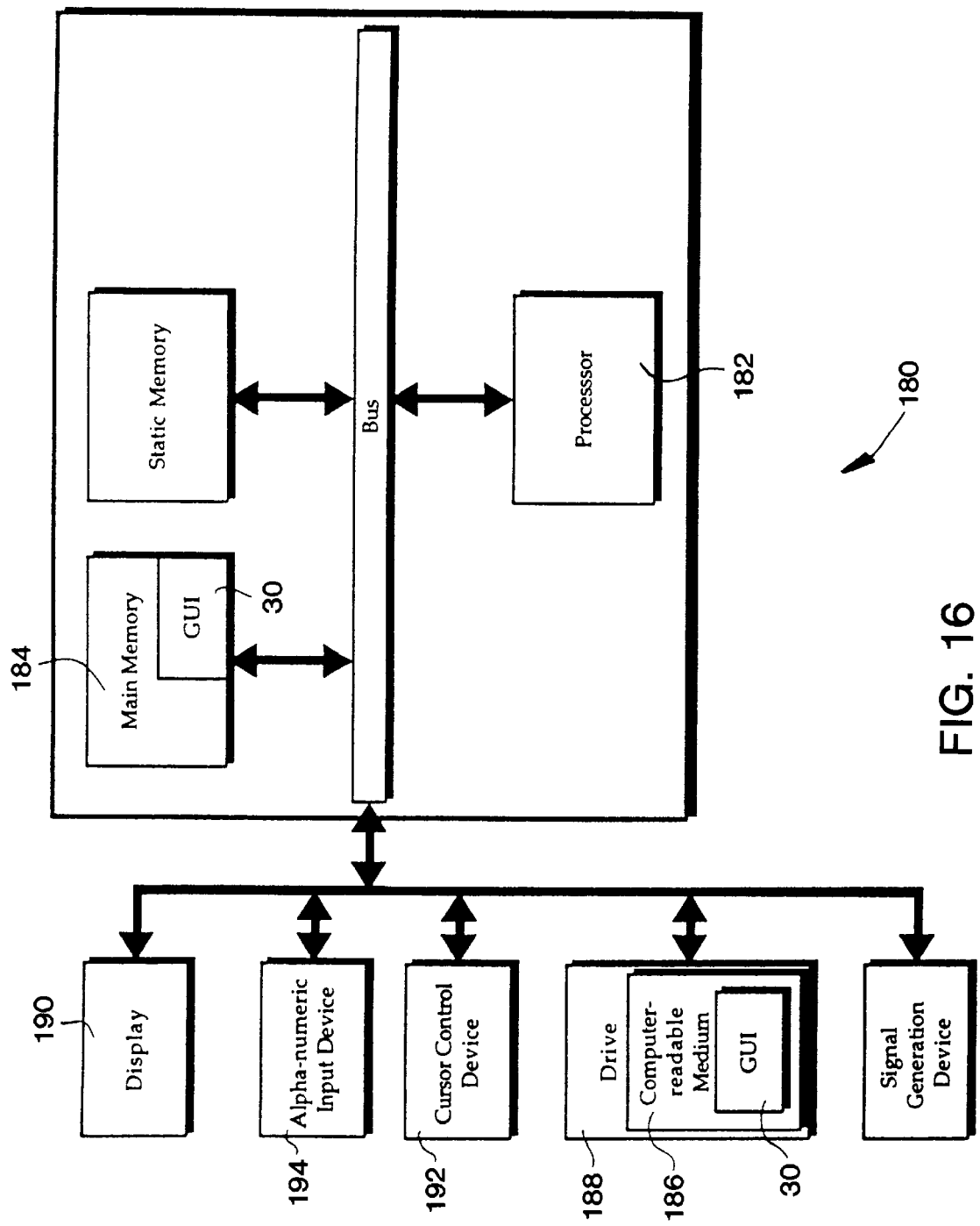
FIG. 16 is a schematic representation of a computer system on which the present invention can be employed.

FIG. 16 shows client network device, in the form of a computer 180, on which the GUI 30 of the present invention can be implemented. The various steps described above are performed by a processor 182 of the computer 180 under the direction of a set of instructions, in the form of a computer program. The computer program comprises the data files and the various modules of the GUI 30 described above. During execution, the GUI 30 at least partially resides in a main memory 184 of the computer 180, as shown in FIG. 16.

In the embodiment, the GUI 30 may also reside on a computer-readable medium 186 (such as a magnetic tape or disk, or an optical disk). In this case, the computer-readable medium 186 is receivable within a drive unit 188, which is able to read the sequences of instructions comprising the GUI 30 from the computer-readable medium 186, and to propagate these instructions to the main memory 184 and/or the processor 182. For the purposes of this specification, the term "computer-readable medium" shall also be taken to include any storage or memory resource capable of storing a computer program. Accordingly, the term shall also be taken to refer to static memory, main memory or any other memory within a computer or network device.

It will of course be appreciated that the computer 180 shown in FIG. 16 is capable of operating as both a server and a client network device. As such, the GUI 30 may be read from the computer-readable medium 186 for the purpose of propagation and distribution from the computer 180 to a further network device.

As shown in FIG. 16, the computer 180 includes a display unit 190 on which the various windows discussed above are displayed. The display unit 190 may be a CRT device or a LCD. The computer 180 also includes a cursor control device (or pointing device) 192, which allows a user to select a graphic object displayed on the main window. The cursor control device 192 may be a mouse. The user may alternatively select a graphic object on the main window using cursor keys on an alpha-numeric input device 194.

The present invention is thus particularly advantageous in that it provides the user of a client network device with an indication as to the availability, and version control, of a software application program displayed by a graphical user interface. This feature is important in that the status of a software program, as well as the version thereof, is modifiable remotely by a network manager, and without input or knowledge of a user of the client network device. Accordingly, it is advantageous to provide the user with some indication in this regard.

Thus, a graphical user interface for use in a de-centralized network environment has been described. Although the present invention has been described with reference to specific exemplary embodiments, it will be evident that various modifications and changes may be made to these embodiments without departing from the broader spirit and scope of the invention. For example, the GUI 30 could be used on a stand-alone computer. Accordingly, the specification and drawings are to be regarded in an illustrative rather than a restrictive sense.

We claim:

1. A computer-implemented method of providing a graphical user interface on a client network device, the client network device being coupled to a server network device and having a storage facility storing a first version of a software program, the method including:

identifying the first version of the software program as being an execution version of the software program;

displaying a graphic object identifying the software program, the graphic object being user selectable to execute the execution version of the software program; and displaying an end-of-life indicator indicating that the first version of the software program is due to become unavailable.

2. The method of claim 1 wherein the first version is a recommended version of the software program, and the identification comprises identifying the recommended version of the software program as the execution version.

3. The method of claim 1 including displaying a recommendation indicator indicating whether the first version of the software program is recommended for use.

4. The method of claim 3 including displaying an availability indicator indicating whether the software program is available for execution, and only providing the recommendation indicator if the first version of the software program is available for execution.

5. The method of claim 1 including:

storing a plurality of execution commands for initiating execution of the software program;

selecting one the plurality of execution commands as being a default execution command; and associating the default execution command with the graphic object representing the software program.

6. The method of claim 1 including:

storing a record for the software program, the record including a version control determinator for indicating whether or not the first version of the software program will automatically be substituted as the execution version by the second version of the software program distributed to the client network device from the server network device; and accessing the record for the software program to display a version control indicator corresponding to the version control determinator.

7. A graphical user interface for use on a client network device, the network device having a storage facility storing a first version of a software program, the first version being designated as an execution version of the software program, and being coupled to a server network device, the graphical user interface comprising:

a graphic object identifying the software program, the graphic object being user selectable to execute the execution version of the software program;

an end-of-life indicator indicating to a user whether the first version of the software program is due to be deleted from the storage facility; and a command generator, responsive to user selection of the graphic object, to issue a command for the execution of the execution version of the software program.

8. The graphical user interface of claim 7 including a recommendation indicator indicating whether the first version of the software program is recommended for use.

9. The graphical user interface of claim 7 including an availability indicator indicating whether the first version of the software program is available for execution.

10. A computer-implemented method of providing a graphical user interface on a client network device, the client network device having a storage facility storing a software program and being coupled to a server network device, the method including:

displaying a graphic object identifying the software program, the graphic object being user selectable to execute the software program;

displaying a status indicator to indicate the status of the software program to a user of the client network device;

remotely changing the status of the software program stored on the storage facility of the client network device from being recommended to being not recommended, or vice versa, utilizing the server network device; and displaying the status indicator to indicate the changed status of the software program.

11. The method of claim 10 wherein remotely changing the status comprises changing the status of the software program from being available to being unavailable, or vice versa.

12. The method of claim 10 wherein remotely changing the status comprises changing the status of the software program to terminal.

13. A computer-readable medium having stored thereon a plurality of instructions which, when executed by a processor within a client network device, cause the processor to perform the steps of:

identifying a first version of a software program, stored on a storage facility accessible by the client network device, as being an execution version of the software program;

displaying a graphic object identifying the software program, the graphic object being user selectable to execute the execution version of the software program; and displaying an end-of-life indicator to indicate that the first version of the software program is due to become unavailable.

14. The computer-readable medium of claim 13 wherein the first version is a recommended version of the software program, and wherein plurality of instructions cause the processor to identify the recommended version of the software program as the execution version.

15. The computer-readable medium of claim 13 having instructions thereon which cause the processor to perform the step of displaying a recommendation indicator indicating whether the first version of the software program is recommended for use.

16. The computer-readable medium of claim 15 having instructions thereon which cause the processor to perform the steps of displaying an availability indicator indicating whether the first version of the software program is available for execution, and only providing the recommendation indicator if the software program is available for execution.

17. The computer-readable medium of claim 13 having instructions thereon which cause the processor to perform the steps of:

storing a plurality of execution commands for initiating execution of the software program;

selecting one the plurality of execution commands as being a default execution command; and associating the default execution command the graphic object representing the software program.

18. The computer-readable medium of claim 13 having instructions thereon which cause the processor to perform the steps of:

storing a record for the software program, the record including a version control determinator for indicating whether or not the first version of the software program will automatically be replaced as the execution version by the second version of the software program distributed to the client network device from the server network device; and accessing the record for the software program to display a version control indicator corresponding to the version control determinator.

19. A computer-readable medium according to claim 13 having stored thereon a plurality of instructions which, when executed by a processor within a first network device, cause the processor to perform the steps of:

storing a record for the software program, the record including data, supplemental to an execution command required to initiate execution of the software program; and accessing the record for the software program prior to issuing the execution command.

20. A computer-readable medium having stored thereon a plurality of instructions which, when executed by a processor within a computer, cause the processor to perform the steps of:

identifying a first version of a software program, stored on a storage facility accessible by the computer, as an execution version of the software program;

displaying a graphic object identifying the software program, the graphic object being user selectable to execute the execution version of the software program; and displaying an end-of-life indicator to indicate that the first version of the software program is due to become unavailable.

21. A graphical user interface for use on a client network device, the network device having a storage facility storing a first version of a software program and being coupled to a server network device, the graphical user interface comprising:

a graphic object identifying the software program, the graphic object being user selectable to execute the first version of the software program;

a status indicator to indicate a status of the first version of the software program to a user of the client device and, responsive to a remote changing of the status of the first version of the software program from being recommended to being not recommended, utilizing the server network device, to indicate the changed status of the first version of the software program; and a command generator, responsive to user selection of the graphic object, to issue a command for the execution of the first version of the software program.

22. The graphical user interface of claim 21 wherein the status indicator indicates a remote change in the status of the first version of the software program from being available to being unavailable, or vice versa.

23. The graphical user interface of claim 21 wherein the status indicator indicates a remote change in the status of the first version of the software program to terminal.

24. A computer-readable medium having stored thereon a plurality of instructions which, when executed by a processor within a computer, cause the processor to perform the steps of:

displaying a graphic object on a display unit, the graphic object identifying a first version of a software program and being user selectable to execute the first version of the software program, the first version of the software program being stored on a storage facility of a client network device;

displaying a status indicator on the display unit to indicate a status of the first version of the software program; and displaying the status indicator on the display unit to indicate a changed status of the first version of the software program responsive to a remote changing of the status of the first version of the software program, stored on the storage facility of the client network device, from being recommended to being not recommended.

25. A computer-implemented method of providing a graphical user interface on a client network device, the client network device having a storage facility storing a software program and being coupled to a server network device, the method including:

displaying a graphic object on a display unit, the graphic object identifying a first version of a software program and being user selectable to execute the first version of the software program, the first version of the software program being stored on a storage facility of a client network device;

displaying a status indicator on the display unit to indicate a status of the first version of the software program;

changing the status of the first version of the software program from being recommended to being not recommended via the server network device; and displaying the status indicator on the display unit to indicate that the status of the first version of the software program, stored on the storage facility of the client network device, has been changed from being recommended to being not recommended.

* * * * *